United States Patent Office 3,103,523
Patented Sept. 10, 1963

3,103,523
2-ETHYLENE ANDROSTANES
Albert Bowers and James C. Orr, Mexico City, Mexico, assignors, by mesne assignments, to Syntex Corporation, a corporation of Panama
No Drawing. Filed Jan. 3, 1962, Ser. No. 164,182
20 Claims. (Cl. 260—397.5)

The present invention relates to novel cyclopentanophenanthrene compounds and to a process for the production thereof.

More particularly the present invention relates to novel 2-ethylene androstane derivatives.

The novel compounds of the present invention which are potent appetite stimulants and anabolic-androgenic agents with a favorable anabolic-androgenic ratio, exhibit anti-estrogenic, anti-gonadotrophic, blood cholesterol lowering, anti-fibrillatory and central nervous system depressing activities and in addition relieve the pre-menstrual tension, are represented by the following formulas:

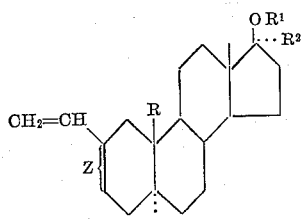

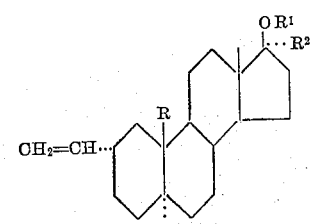

In the above formulas R represents hydrogen or methyl; $R^1$ represents hydrogen or a hydrocarbon carboxylic acyl group of less than 12 carbon atoms; $R^2$ represents hydrogen, lower alkyl, lower alkenyl, or lower alkynyl and Z represents a double bond or a saturated linkage between C-2 and C-3. The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

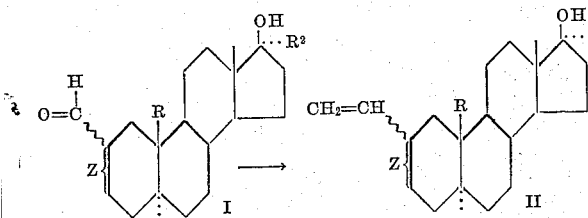

In the above formulas R, $R^2$ and Z have the same meaning as hereinbefore set forth. In practicing the process just outlined the starting compound (I) which may be a 2-formyl-Δ²-androstene derivative (described in copending application Serial No. 128,974, filed August 3, 1961) or a 2α-or-2β-formyl androstane derivative (described in copending application Serial No. 128,971, filed August 3, 1961), is treated with a triphenyl phosphonium methyl halide, such as the bromide, in the presence of a lower alkyl-lithium compound, preferably butyl lithium, at room temperature for a period of time of the order of 24 hours, thus affording the corresponding 2-vinyl derivative (II).

The final compounds wherein the 17α-position is occupied by a hydrogen (II: $R^2$=H), are conventionally acylated in pyridine with an acylating agent as for example acetic anhydride or propionic anhydride, to give the corresponding 17β-acyloxy derivatives.

The above obtained 2-vinyl-17α-substituted 17β-hydroxy derivatives (II: $R^2$=hydrocarbon) are conventionally acylated in the presence of p-toluenesulfonic acid with excess acylating agent such as the anhydride of a hydrocarbon carboxylic acid of the type described above, thus yielding the corresponding 17β-acyloxy-17α-substituted derivatives.

The following specific examples serve to illustrate but are not intended to limit the scope of the present invention:

Example I

A suspension of 14.5 g. of triphenylphosphonium methyl bromide in 250 cc. of anhydrous ether was treated, under an atmosphere of nitrogen, with 40 cc. of a 1 N ethereal solution of butyl lithium and the mixture was stirred for 2 hours at room temperature. A solution of 5 g. of 2-formyl-Δ²-androsten-17β-ol in 100 cc. of ether was then added dropwise in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate; the organic extract was washed with water, dried over anhydrous sodium sulfate and evaporated to dryness. Chromatography of the residue and recrystallization of the solid eluates from acetone-hexane gave 2-vinyl-Δ²-androsten-17β-ol.

Following the same procedure, there were treated: 2-formyl-17α-methyl-Δ²-androsten-17β-ol, 2 - formyl - 17α-vinyl-Δ²-androsten-17β-ol, and 2-formyl-17α-ethynyl-Δ²-androsten-17β-ol, thus yielding, correspondingly:

2-vinyl-17α-methyl-Δ²-androsten-17β-ol, 2,17α-divinyl-Δ²-androsten-17β-ol, 2-vinyl-17α-ethynyl - Δ² - androsten-17β-ol.

Example II 2-formyl-19 nor-Δ²-androsten-17β-ol, 2 - formyl - 17α-methyl-19 nor-Δ²-androsten-17β-ol, and 2 - formyl - 17α-ethynyl-19 nor-Δ²-androsten-17β-ol were treated as described in the preceding example, affording correspondingly:

2-vinyl-19 nor-Δ²-androsten-17β-ol, 2-vinyl-17α-methyl-19 nor-Δ²-androsten17β-ol, and 2-vinyl-17α-ethynyl-19 nor-Δ²-androsten-17β-ol.

Example III

Following the procedure described in Example I, there were treated 2α-formyl-17α-methyl-androstan-17β-ol, 2α-formyl-17α-vinyl-androstan-17β-ol, 2α - formyl-17α-ethynyl-androstan-17β-ol, and 2α-formyl-androstan - 17β - ol, giving correspondingly:

2α-vinyl-17α-methyl-androstan-17β-ol, 2α,17α-divinylandrostan-17β-ol, 2α-vinyl-17α-ethynyl-androstan-17β-ol, and 2α-vinyl-androstan-17β-ol.

*Example IV*

In accordance with Example I, there were treated 2α-formyl-17α-ethynyl-19 nor-androstan-17β-ol, and 2α-formyl-19 nor-androstan-17β-ol, yielding correspondingly:

2α-vinyl-17α-ethynyl-19 nor-androstan-17β-ol, and 2α-vinyl-19 nor-androstan-17β-ol.

*Example V*

The following compounds were treated as described in Example I:

2β - formyl - androstan - 17β - ol, 2β-formyl-17α-ethyl-androstan-17β-ol, 2β - formyl - 17α - propargyl-androstan-17β-ol, and 2β-formyl - 17α - vinyl-androstan-17β-ol, thus affording correspondingly:

2β-vinyl-androstan-17β-ol, 2β-vinyl - 17α - ethyl-androstan-17β-ol, 2β-vinyl-17α-propargyl-androstan-17β-ol, and 2β,17α-divinyl-androstan-17β-ol.

*Example VI*

Following the procedure described in Example I, there were treated:

2β-formyl-19 nor-androstan - 17β - ol, 2β-formyl - 17α-methyl - 19 nor-androstan - 17β - ol, and 2β-formyl-17α-ethynyl-19 nor-androstan - 17β - ol, yielding correspondingly:

2β-vinyl-19 nor-androstan-17β-ol, 2β-vinyl-17α-methyl-19-nor-androstan-17β-ol, and 2β-vinyl - 17α - ethynyl - 19 nor-androstan-17β-ol.

*Example VII*

A mixture of 1 g. of 2-vinyl-Δ²-androsten-17β-ol, 4 cc. of pyridine and 2 cc. of acetic anhydride was kept at room temperature overnight, poured into ice water; the formed precipitate was filtered, washed with water and dried. Crystallization from acetone-hexane gave:

17-acetate of 2-vinyl-Δ²-androsten-17β-ol.

Following the same technique, there were treated:

2β-vinyl-androstan-17β-ol, 2α-vinyl-androstan - 17β - ol, 2α-vinyl-19 nor-androstan-17β-ol, 2β-vinyl-19 nor-androstan-17β-ol, and 2-vinyl-19-nor-Δ²-androsten-17β-ol, giving correspondingly:

17-acetate of 2β-vinyl-androstan-17β-ol, 17-acetate of 2α-vinyl-androstan-17β-ol, 17-acetate of 2α-vinyl-19 nor-androstan-17β-ol, 17-acetate of 2α-vinyl-19 nor-androstan-17β-ol, 17-acetate of 2β-vinyl-19 nor-androstan-17β-ol, and 17-acetate of 2-vinyl-19 nor-Δ²-androsten-17β-ol.

*Example VIII*

The starting compounds of the preceding example were treated following the technique described in the said example, with the exception that acetic anhydride was substituted by propionic anhydride, caproic anhydride and benzoyl chloride, thus giving the corresponding 17-propionates, 17-caproates and 17-benzoates.

*Example IX*

A mixture of 1 g. of 2-vinyl-17α-methyl-Δ²-androsten-17β-ol, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave the 17-acetate of 2-vinyl-17α-methyl-Δ²-androsten-17β-ol.

The starting compounds listed below were treated by the same procedure, thus furnishing the corresponding products, hereinafter set forth:

| Starting Compounds | Products |
|---|---|
| 2,17α-divinyl-Δ²-androsten-17β-ol | 17-acetate of 2,17α-divinyl-Δ²-androsten-17β-ol. |
| 2-vinyl-17α-ethynyl-Δ²-androsten-17β-ol. | 17-acetate of 2-vinyl-17α-ethynyl-Δ²-androsten-17β-ol. |
| 2-vinyl-17α-methyl-19 nor-Δ²-androsten-17β-ol. | 17-acetate of 2-vinyl-17α-methyl-19 nor-Δ²-androsten-17β-ol. |
| 2-vinyl-17α-ethynyl-19 nor-Δ²-androsten-17β-ol. | 17-acetate of 2-vinyl-17α-ethynyl-19 nor-Δ²-androsten-17β-ol. |
| 2α-vinyl-17α-methyl-androstan-17β-ol. | 17-acetate of 2α-vinyl-17α-methyl-androstan-17β-ol. |
| 2α,17α-divinyl-androstan-17β-ol | 17-acetate of 2α,17α-divinyl-androstan-17β-ol. |
| 2α-vinyl-17α-ethynyl-androstan-17β-ol. | 17-acetate of 2α-vinyl-17α-ethynyl-androstan-17β-ol. |
| 2α-vinyl-17α-ethynyl-19 nor-androstan-17β-ol. | 17-acetate of 2α-vinyl-17α ethynyl-19 nor-androstan-17β-ol. |
| 2β-vinyl-17α-ethynyl-androstan-17β-ol. | 17-acetate of 2β-vinyl-17α-ethyl-androstan-17β-ol. |
| 2β,17α-divinyl-androstan-17β-ol. | 17-acetate of 2β,17α-divinyl-androstan-17β-ol. |
| 2β-vinyl-17α-propargyl-androstan-17β-ol. | 17-acetate of 2β, vinyl-17α-propargyl-androstan-17β-ol. |
| 2β-vinyl-17α-methyl-19 nor-androstan-17β-ol. | 17-acetate of 2β-vinyl-17α-methyl-19 nor-androstan-17β-ol. |
| 2β-vinyl-17α-ethynyl-19 nor-androstan-17β-ol. | 17α-acetate of 2β-vinyl-17α-ethynyl-19 nor-androstan-17β-ol. |

*Example X*

Following the technique described in the preceding example, there were treated the starting compounds indicated in the same example, except that instead of acetic anhydride, there was substituted propionic anhydride, caproic anhydride, and cyclopentylpropionic anhydride. There were obtained the corresponding 17-propionates, 17-caproates and 17-cyclopentylpropionates.

We claim:

1. A compound of the following formula:

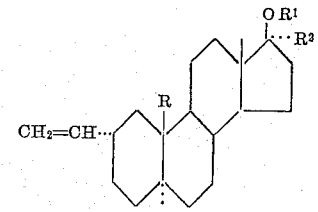

wherein R is selected from the group consisting of hydrogen and methyl; $R^1$ is a member of the group consisting of hydrogen and a hydrocarbon carboxylic acyl group of less than 12 carbon atoms and $R^2$ is selected from the group consisting of hydrogen, lower alkyl, lower alkenyl and lower alkynyl.

2. 2α-vinyl-19-nor-androstan-17β-ol.
3. 2α-vinyl-17α-methyl-androstan-17β-ol.
4. 2α,17α-divinyl-androstan-17β-ol.
5. 2α-vinyl-17α-ethynyl-19-nor-androstan-17β-ol.
6. A compound of the following formula:

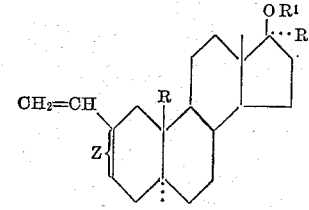

wherein R is selected from the group consisting of hydrogen and methyl, $R^1$ is a member of the group consisting of hydrogen and a hydrocarbon carboxylic acyl group of less than 12 carbon atoms, $R^2$ is selected from the group consisting of hydrogen, lower alkyl, lower alkenyl and lower alkynyl and Z is selected from the group consisting of a double bond and a saturated linkage between C-2 and C-3.

7. 2-vinyl-Δ²-androsten-17β-ol.
8. 2-vinyl-17α-methyl-Δ²-androsten-17β-ol.
9. 2,17α-divinyl-Δ²-androsten-17β-ol.

10. 2-vinyl-17α-ethynyl-Δ²-androsten-17β-ol.
11. 2-vinyl-19-nor-Δ²-androsten-17β-ol.
12. 2-vinyl-17α-methyl-19-nor-Δ²-androsten-17β-ol.
13. 2-vinyl-17α-ethynyl-19-nor-Δ²-androsten-17β-ol.
14. 2β-vinyl-androstan-17β-ol.
15. 2β-vinyl-17α-ethyl-androstan-17β-ol.
16. 2β-vinyl-17α-propargyl-androstan-17β-ol.
17. 2β-vinyl-19-nor-androstan-17β-ol.
18. 2β-vinyl-17α-methyl-19-nor-androstan-17β-ol.

19. A process for the production of 2-vinyl androstane derivatives which comprises treating the corresponding 2-formyl-androstane compounds with a triphenyl phosphonium methyl halide in the presence of a lower alkyl-lithium compound.

20. The process of claim 19 wherein the halide is the bromide and the lower alkyl-lithium is butyl lithium.

No references cited.